(12) United States Patent
Moyer (10) Patent No.: US 8,990,660 B2
(45) Date of Patent: Mar. 24, 2015

(54) DATA PROCESSING SYSTEM HAVING END-TO-END ERROR CORRECTION AND METHOD THEREFOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1220 days.

(21) Appl. No.: 12/880,352

(22) Filed: Sep. 13, 2010

(65) Prior Publication Data

US 2012/0066567 A1 Mar. 15, 2012

(51) Int. Cl.
- *H03M 13/35* (2006.01)
- *H03M 13/00* (2006.01)
- *G06F 11/10* (2006.01)

(52) U.S. Cl.
CPC .................................. *G06F 11/1048* (2013.01)
USPC ........... 714/774; 714/752; 714/763; 714/773; 711/100; 711/154; 711/170

(58) Field of Classification Search
None
See application file for complete search history.

(56) References Cited

U.S. PATENT DOCUMENTS

| | | | |
|---|---|---|---|
| 3,814,922 A | 6/1974 | Nibby et al. | |
| 4,768,197 A | 8/1988 | Petolino et al. | |
| 4,897,839 A | 1/1990 | Yamagishi et al. | |
| 5,099,484 A | 3/1992 | Smelser | |
| 5,146,461 A | 9/1992 | Duschatko et al. | |
| 5,173,905 A | 12/1992 | Parkinson et al. | |
| 5,375,127 A | 12/1994 | Leak et al. | |
| 5,430,742 A | 7/1995 | Jeddeloh et al. | |
| 5,848,293 A | 12/1998 | Gentry | |
| 5,954,831 A | 9/1999 | Chang | |
| 5,978,953 A | 11/1999 | Olarig | |
| RE36,448 E | 12/1999 | Brady | |
| 6,253,273 B1 | 6/2001 | Blumenau | |
| 6,480,975 B1 | 11/2002 | Arimilli et al. | |
| 6,772,383 B1 | 8/2004 | Quach et al. | |
| 6,880,112 B2 | 4/2005 | Lajolo | |
| 6,954,826 B2 | 10/2005 | Moyer | |
| 7,069,494 B2 | 6/2006 | Cargnoni et al. | |
| 7,257,762 B2 | 8/2007 | Holm et al. | |
| 7,272,773 B2 | 9/2007 | Cargnoni et al. | |
| 7,334,179 B2 | 2/2008 | Zhang et al. | |
| 7,337,352 B2* | 2/2008 | DeSota .......................... | 714/6.1 |
| 7,376,877 B2 | 5/2008 | Quach et al. | |

(Continued)

OTHER PUBLICATIONS

Notice of Allowance mailed Jun. 18, 2013 in U.S. Appl. No. 13/053,962, 26 pages.

(Continued)

*Primary Examiner* — Justin R Knapp (57) ABSTRACT

In a data processing system having a plurality of error coding function circuitries, a method includes receiving an address which indicates a first storage location for storing a first data value; using a first portion of the address to select one of the plurality of error coding function circuitries as a selected error coding function circuitry; and using the selected error coding function circuitry to generate a first checkbit value, wherein the selected error coding function circuitry uses the first data value to generate the first checkbit value. When the first portion of the address has a first value, a first one of the plurality of error coding function circuitries is selected as the selected error coding function circuitry. When the first portion of the address has a second value, a second one of the plurality of error coding function circuitries is selected as the selected error coding function circuitry.

11 Claims, 7 Drawing Sheets

(56) References Cited

U.S. PATENT DOCUMENTS

| | | | |
|---|---|---|---|
| 7,398,449 B1* | 7/2008 | Normoyle et al. | 714/767 |
| 7,409,502 B2 | 8/2008 | Moyer et al. | |
| 7,437,597 B1* | 10/2008 | Kruckemyer et al. | 714/6.11 |
| 7,480,847 B2 | 1/2009 | Schulz | |
| 7,506,226 B2 | 3/2009 | Gajapathy et al. | |
| 7,526,713 B2 | 4/2009 | Klein | |
| 7,568,146 B2 | 7/2009 | Takahashi et al. | |
| 7,617,437 B2 | 11/2009 | Moyer | |
| 7,900,100 B2 | 3/2011 | Gollub | |
| 7,996,727 B2* | 8/2011 | Radke | 714/42 |
| 8,276,039 B2* | 9/2012 | Wuu et al. | 714/758 |
| 8,291,305 B2* | 10/2012 | Moyer et al. | 714/799 |
| 2003/0188251 A1 | 10/2003 | Brown et al. | |
| 2005/0240745 A1 | 10/2005 | Iyer et al. | |
| 2005/0257025 A1 | 11/2005 | Spencer | |
| 2006/0010339 A1 | 1/2006 | Klein | |
| 2006/0031739 A1 | 2/2006 | Gan et al. | |
| 2006/0117239 A1 | 6/2006 | Lin et al. | |
| 2006/0236205 A1 | 10/2006 | Kuramoto et al. | |
| 2007/0136647 A1 | 6/2007 | Kanai et al. | |
| 2007/0150671 A1 | 6/2007 | Kurland | |
| 2007/0266297 A1 | 11/2007 | Liang et al. | |
| 2007/0277085 A1 | 11/2007 | Goessel et al. | |
| 2008/0016428 A1 | 1/2008 | Lee et al. | |
| 2008/0055125 A1 | 3/2008 | Cideciyan et al. | |
| 2008/0109705 A1 | 5/2008 | Pawlowski et al. | |
| 2008/0162829 A1 | 7/2008 | Scott et al. | |
| 2008/0235558 A1 | 9/2008 | Normoyle et al. | |
| 2008/0294840 A1 | 11/2008 | Bliss et al. | |
| 2009/0049350 A1 | 2/2009 | Parris et al. | |
| 2009/0100315 A1 | 4/2009 | Lee | |
| 2009/0158120 A1* | 6/2009 | Palanki et al. | 714/758 |
| 2009/0249148 A1 | 10/2009 | Ito et al. | |
| 2009/0307537 A1 | 12/2009 | Chen et al. | |
| 2010/0106872 A1 | 4/2010 | Moyer et al. | |
| 2010/0107243 A1 | 4/2010 | Moyer et al. | |
| 2011/0040924 A1 | 2/2011 | Selinger | |
| 2011/0138252 A1 | 6/2011 | Pawlowski et al. | |
| 2012/0166904 A1 | 6/2012 | Bandholz | |

OTHER PUBLICATIONS

Final Office Action mailed Aug. 26, 2013 in U.S. Appl. No. 13/159,878, 26 pages.
Notice of Allowance mailed Jul. 24, 2013 for U.S. Appl. No. 13/097,721, 6 pages.
Final Office Action mailed May 15, 2012 in U.S. Appl. No. 13/097,721;10 pages.
Non-Final Office Action mailed Apr. 5, 2013 for U.S. Appl. No. 13/159,878, 36 pages.
Non-Final Office Action mailed Jan. 18, 2013 for U.S. Appl. No. 13/097,721, 29 pages.
U.S. Appl. No. 13/053,962, filed Mar. 22, 2011, entitled "Selective Checkbit Modification for Error Correction,".
U.S. Appl. No. 13/159,878, filed Jun. 14, 2011, entitled "Selective Masking for Error Correction,".
U.S. Appl. No. 13/097,721, filed Apr. 29, 2011, entitled "Selective Error Detection and Error Correction for a Memory Interface,".
Final Office Action mailed Aug. 13, 2014 in U.S. Appl. No. 13/159,878, 35 pages.
Non-Final Office Action mailed Mar. 14, 2014 in U.S. Appl. No. 13/159,878, 29 pages.

* cited by examiner

TABLE S

| CHECKBITS chkb_evenw_[0:7] | DATA BIT | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | BYTE 0 | | | | | | | | BYTE 1 | | | | | | | | BYTE 2 | | | | | | | | BYTE 3 | | | | | | | |
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | * | | | * | * | | * | | * | | * | | * | * | | | | * | | * | | | | | | | | | * | | * | |
| 1 | | * | * | | | * | * | | | | | | * | | * | | * | | | * | | | | | * | * | | * | * | | | |
| 2 | | | | | * | | | | | * | | | * | | * | | * | | * | * | * | | | | | | * | * | | | * | * |
| 3 | | | * | | * | | | | | | | | * | | * | | | | * | * | | * | * | | * | | * | * | | | | * |
| 4 | * | * | * | | | * | | | * | * | * | * | * | | * | | | | * | * | | * | | | * | * | * | | | * | | |
| 5 | * | | * | * | | * | | | | | | | * | | * | | * | * | * | | | | * | | * | | * | * | * | * | | * |
| 6 | | * | | | * | * | * | | * | * | * | * | | | | | | * | | | * | * | * | | * | | | | | | | |
| 7 | | | | * | * | | * | * | | * | | | | * | * | * | | | * | | | | | * | | * | | * | | * | | * |

| CHECKBITS chkb_oddw_[0:7] | BYTE 4 | | | | | | | | BYTE 5 | | | | | | | | BYTE 6 | | | | | | | | BYTE 7 | | | | | | | |
|---|---|---|---|---|---|---|---|---|---|---|---|---|---|---|---|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| 0 | | * | * | | | * | * | | * | * | * | * | | | | | * | | | * | | | | | * | * | | | | * | * | |
| 1 | * | | | * | * | | | * | * | | | * | | | | | | | * | * | | | * | * | * | * | | | * | * | | |
| 2 | * | | | | * | | | | | * | * | | | | * | * | * | * | * | * | | | | * | | | * | | | * | * | * |
| 3 | | | * | | | | * | | * | | | * | | * | | * | * | | | * | | * | | * | * | | | * | | | * | * |
| 4 | * | * | * | * | | | | | | | * | | * | | | | | | | | | | * | | | | | | * | | | * |
| 5 | | | | | | * | * | | * | * | | | * | * | | | | | | * | | * | | | | * | | | * | | | * |
| 6 | | | | | | * | | * | * | | * | | * | | * | | * | | * | | * | | * | | * | | | * | | * | | |
| 7 | | * | | * | * | | * | | * | | | | * | | | | * | | | | * | * | * | | * | | | | * | | | * |

| CHECKBITS h(r,w)chk BIT[0:7] | ADDRESS BIT | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 0 | | * | | * | | * | | * | * | | * | * | | * | | * | * | | * | | * | | * | | * | * | | * | |
| 1 | | * | | * | * | * | * | | | * | * | | | * | * | * | * | | * | | * | | * | * | | * | | | |
| 2 | | | * | * | | | * | * | | * | * | | | * | | * | | * | | * | * | | | * | * | * | * | | |
| 3 | * | * | * | | | * | * | | * | * | * | * | | * | | | | | * | * | | * | * | | * | | * | * | |
| 4 | | * | | | * | | | * | * | | * | | * | | * | | * | | * | | * | * | * | | | * | * | | * |
| 5 | * | * | | | * | | * | | * | * | | | * | * | | * | | * | | * | | * | | * | | * | | * | |
| 6 | * | | | * | * | | * | | * | | | * | | * | | * | * | * | | | * | * | * | | * | | | * | * |
| 7 | * | | * | * | * | | | * | | * | * | * | | * | * | | * | * | * | | | * | * | | | * | * | * | * |

TABLE A

| CHECKBITS chkb_a ddr_[0:7] | ADDRESS BIT | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | | * | | * | | | | | | | | | | | | | * | | * | * | * | * | * | | | * | * | | | | | |
| 1 | * | | * | | | | | | | | * | | * | | * | | | | * | | | | | * | | | | * | | | | |
| 2 | | | | | * | | | | | * | | * | | * | | | | | | * | | | | | * | | | | * | | | |
| 3 | | | | | | * | * | * | * | | * | | | | | * | * | | | | * | * | * | * | | * | * | * | * | | | |
| 4 | | * | * | | | | * | | | | | | | | * | * | * | * | | | | | | | * | | * | | | | | |
| 5 | * | * | | * | | * | | | * | * | | | | | | | | | | | * | * | * | * | * | | | | | | | |
| 6 | * | | | | | | | * | | * | | * | * | * | | | | * | * | | | | | | * | * | * | * | * | | | |
| 7 | | | | * | * | | * | * | | | * | * | | | | * | * | * | | | | | | | * | * | * | * | * | | | |

FIG. 9

TABLE B

| CHECKBITS chkb_a ddr_[0:7] | ADDRESS BIT | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | | | | | | | | | | | | | | | | | | | * | | * | | * | | | * | | * | | | | |
| 1 | | | | | | | | | | | | | | | | | | | | * | | * | | * | | | * | | * | | | |
| 2 | | | | | | | | | | | | | | | | | | | * | | | | * | | | * | | | * | | | |
| 3 | | | | | | | | | | | | | | | | | | | | * | | | | * | | | * | | | * | | |
| 4 | | | | | | | | | | | | | | | | | | | * | | * | * | | | * | | * | * | | * | | |
| 5 | | | | | | | | | | | | | | | | | | | | * | * | * | | * | | * | * | | * | * | | |
| 6 | | | | | | | | | | | | | | | | | | | * | | * | | * | * | * | * | | * | | * | | |
| 7 | | | | | | | | | | | | | | | | | | | | * | | * | * | * | * | | * | | * | * | | |

DATA PROCESSING SYSTEM HAVING END-TO-END ERROR CORRECTION AND METHOD THEREFOR

BACKGROUND

1. Field

This disclosure relates generally to data processing, and more specifically, to a data processing system having end-to-end error correction and method therefor.

2. Related Art

A memory system may use error correction code (ECC) to detect and correct errors in stored data. End-to-end ECC provides error detection capabilities from one end of an information transfer structure, through a temporary storage component, to another end of the information transfer structure. End-to-end ECC generates error protection codes at the source of the data transfer. When a memory write operation is initiated by a bus master, the data and error protection codes are stored in the temporary storage component. At the other end of the transfer, data integrity is checked using the previously stored error protection codes.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, an end-to-end ECC scheme that transforms an ECC granularity from 64 bits of data code to 32 bits in an efficient manner. A transformation table is generated for the full 64-bit granularity based on an ECC H-matrix algorithm. The particular tables used for 32-bit granularity are selected to be subsets of the 64-bit table. This provides a relatively straightforward and efficient ECC transformation between 64 bits of data and 32 bits of data.

To provide address error detection when accessing cache or other memory arrays, addressing information is combined with the data information to compose a combined ECC codeword which is stored in the cache or memory. Such a combined codeword is capable of detecting not only errors in the stored data, but also certain addressing errors or failures, such as accessing a cache location that is different from the intended location due to a hardware error. Such accesses in conventional error coding schemes would not typically be detected, because a valid codeword would be read from the cache, albeit from an unintended address location. Because a given cache entry can store data corresponding to multiple different addresses based on the cache TAG value, the address portion of the cache coding scheme is a function of the cached address. This address is typically a physical address that is only obtained after performing address translation through a memory management unit (MMU). The coding scheme of the described embodiment alters the address component from a 29-bit doubleword memory address to a smaller cache array index address. Using the cache index address instead of the cache TAG value for address error detection is faster because no MMU lookup is involved and the cache index is available early in the cache lookup process.

In one aspect, there is provided, in a data processing system having a plurality of error coding function circuitries, each implementing a different coding function, a method for generating a checkbit value, the method comprising: receiving an address which indicates a first storage location for storing a first data value; using a first portion of the address to select one of the plurality of error coding function circuitries as a selected error coding function circuitry, wherein: when the first portion of the address has a first value, selecting a first one of the plurality of error coding function circuitries as the selected error coding function circuitry, and when the first portion of the address has a second value, different from the first value, selecting a second one of the plurality of error coding function circuitries as the selected error coding function circuitry; and using the selected error coding function circuitry to generate a first checkbit value, wherein the selected error coding function circuitry uses the first data value to generate the first checkbit value. The selected error coding function circuitry may use the first data value and a second portion of the address to generate the first checkbit value. The first portion of the address may be further characterized as a more significant portion of the address than the second portion of the address. The second portion of the address may not include the first portion of the address. The method may further comprise storing the first data value and the first checkbit value. The method may further comprise: receiving a second address which indicates a second storage location for storing a second data value; using a first portion of the second address to select another one of the plurality of error coding function circuitries as a second selected error coding function circuitry; using the second selected error coding function circuitry to generate a second checkbit value, wherein the second selected error coding function circuitry uses the second data value to generate the second checkbit value; storing the second data value and the second checkbit value; accessing the stored first data value, first checkbit value, second data value, and second checkbit value; transforming the first checkbit value and the second checkbit value into a third checkbit value which has a granularity to cover both the first and the second data value; and storing the first data value concatenated with the second data value and the third checkbit value in a third storage location. The method may further comprise transferring the first data value concatenated with a second data value over a system interconnect and using the third checkbit value to perform end to end error detection of the first data value concatenated with a second data value. The step of transforming may comprise performing a bit-wise exclusive OR of the first checkbit value with the second checkbit value to obtain the third checkbit value. The step of transforming may comprise: performing a bit-wise exclusive OR of the first checkbit value with the second checkbit value to obtain a fourth checkbit value based on the first data value concatenated with the second data value; providing a second portion of the address to address error coding function circuitry to generate a fifth checkbit value based on the second portion of the address; and performing a bit-wise exclusive OR of the fourth checkbit value with the fifth checkbit value to obtain the third checkbit value.

In another aspect, there is provided, in a data processing system having a processor and a memory coupled to the processor via a system interconnect, a method comprising: initiating a read operation of a memory location; in response to the initiating the read operation, receiving a first data value and a first checkbit value corresponding to the first data value from the memory location, wherein the first data value comprises a first data value portion and a second data value portion, each of the first and second data value portions having fewer bits than the first data value; providing the first checkbit value to first transforming circuitry and to second transforming circuitry, wherein the first transforming circuitry generates a second checkbit value corresponding to the first data value portion and the second transforming circuitry generates a third checkbit value corresponding to the second data value portion; and storing the first data value portion with the second checkbit value in a first storage location and storing the second data value portion with the third checkbit value in a second storage location. The method may further comprise: accessing the first data value portion and the second checkbit value; and using the second checkbit value and not the first checkbit value to check the first data value portion. The method may further comprise, in response to the step of initiating the read operation, the memory providing the first data value and the second checkbit value to the processor via the system interconnect; and after the step of receiving the first data value and the second checkbit value and prior to the step of providing the first checking value to the first transforming circuitry and the second transforming circuitry, performing, by the processor, end to end error detection by using the first checkbit value to check the first data value. Each of the first and second storage locations may be located within a cache memory of the processor and the memory location is located in the memory, and wherein the step of initiating the read operation is performed in response to a cache miss or a cache fill. The first transforming circuitry may use system error coding function circuitry for generating a checkbit value for an N-bit data value, first internal error coding function circuitry for generating a checkbit value for an M-bit data value, and cache index error coding function circuitry for generating a checkbit value for a cache index of the cache, the second transforming circuitry may use the system error coding function circuitry, second internal error coding function circuitry for generating a checkbit value for the M-bit data value, and the cache index error coding function circuitry, and the second internal error coding function circuitry may implement a different coding function than the first internal error coding function and N is greater than M, the first data value being an N-bit data value and each of the first and second data value portions being the M-bit data value. The first transforming circuitry may use system error coding function circuitry for generating a checkbit value for an N-bit data value and first internal error coding function circuitry for generating a checkbit value for an M-bit data value, the second transforming circuitry may use the system error coding function circuitry and second internal error coding function circuitry for generating a checkbit value for an M-bit data value, and the second internal error coding function circuitry may implement a different coding function that the first internal error coding function and N is greater than M, the first data value being an N-bit data value and each of the first and second data value portions being an M-bit data value. The system error coding function circuitry may comprise a first plurality of exclusive OR (XOR) gates, wherein each XOR gate of the first plurality of XOR gates outputs one corresponding bit value of the first checkbit value, and wherein each XOR gate of the first plurality of XOR gates receives a predetermined subset of bit values of the first data value; the first internal error coding function circuitry may comprise a second plurality of XOR gates, wherein each XOR gate of the second plurality of XOR gates outputs one corresponding bit value of the third checkbit value, and wherein each XOR gate of the second plurality of XOR gates receives a predetermined subset of bit values of the second data value portion; and the second internal error coding function circuitry may comprise a third plurality of XOR gates, wherein each XOR gate of the third plurality of XOR gates outputs one corresponding bit value of the second checkbit value, and wherein each XOR gate of the third plurality of XOR gates may receive a predetermined subset of bit values of the first data value portion.

In yet another aspect, there is provided, in a data processing system having a processor and a memory coupled to the processor via a system interconnect, a method comprising: accessing a cache of the processor to access a first storage location and an adjacent second storage location, wherein the first storage location comprises a first data value and a first checkbit value corresponding to the first data value and the second storage location comprises a second data value and a second checkbit value corresponding to the second data value; transforming the first checkbit value and the second checkbit value into a third checkbit value which has a granularity to cover the first data value combined with the second data value; and storing the first data value concatenated with the second data value and the third checkbit value in a storage location of the memory. The method may further comprise: transferring the first data value concatenated with the second data value over the system interconnect from the memory to the processor; and using the third checkbit value to perform end to end error detection of the first data value concatenated with the second data value. The step of transforming may comprise: performing a bit-wise exclusive OR (XOR) of the first checkbit value with the second checkbit value to obtain the third checkbit value. The step of transforming comprises: performing a bit-wise XOR of the first checkbit value with the second checkbit value to obtain a fourth checkbit value based on the first data value concatenated with the second data value; providing a second portion of the address to address error coding function circuitry to generate a fifth checkbit value based on the second portion of the address; and performing a bit-wise exclusive OR of the fourth checkbit value with the fifth checkbit value to obtain the third checkbit value.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
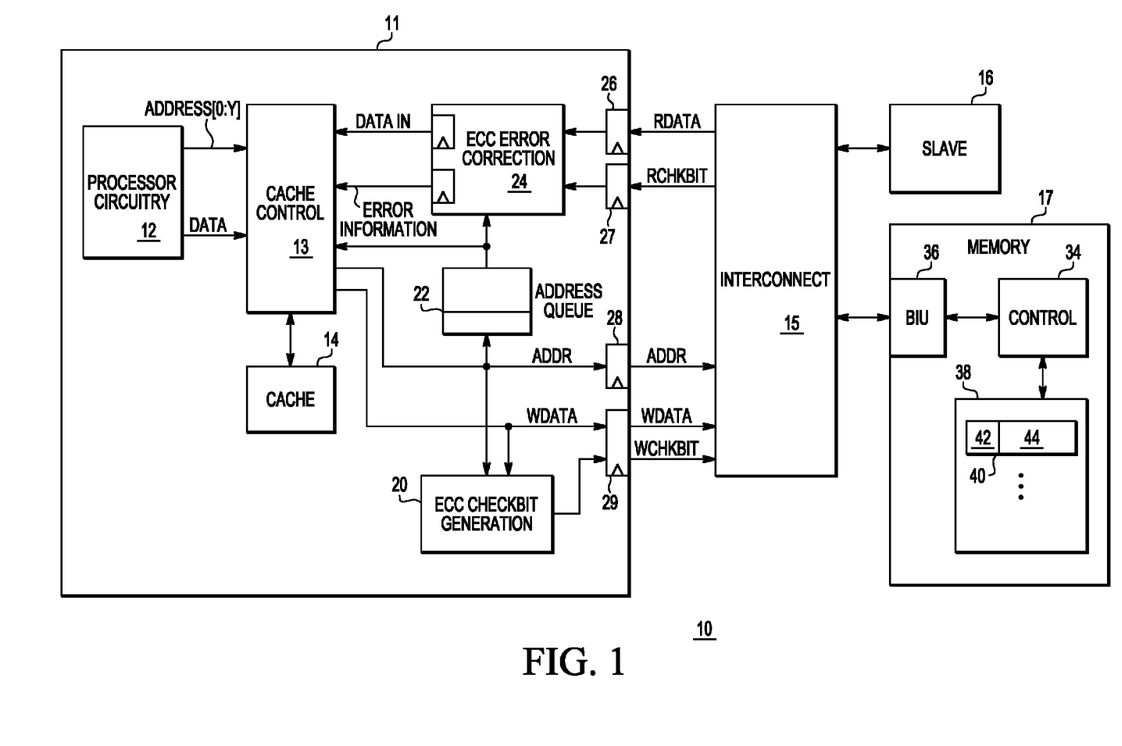
FIG. 1 illustrates, in block diagram form, a data processing system in accordance with an embodiment.

FIG. 1 illustrates, in block diagram form, a simplified view of data processing system 10 in accordance with an embodiment. Data processing system 10 includes processor 11, interconnect 15, slave 16, and memory 17. Processor 11 includes processing circuitry 12, cache control circuit 13, cache 14, ECC checkbit generation circuit 20, transaction address queue 22, ECC error correction 24, and latches 26-29. Memory 17 includes control circuit 34, bus interface unit (BIU) 36, and memory array 38. Memory array 38 includes a plurality of multi-bit entries. Entry 40 is a representative entry and includes a multi-bit checkbit portion 42 and a multi-bit data portion 44, where the checkbit portion 42 corresponds to the multi-bit data portion 44. In one embodiment, data processing system 10 is a system-on-a-chip (SoC). In one embodiment, processing circuitry 12 is a bus master and may be a central processing unit (CPU) or core and may include a load/store unit, an instruction fetch unit, and one or more execution units. In another embodiment, processing circuitry 12 may be a different type of bus master.

Processing circuitry 12 has an output for providing a plurality of address signals labeled "ADDRESS[0:Y]", wherein Y is an integer, and an output for providing a plurality of data signals labeled "DATA". Cache control circuit 13 has an input for receiving address ADDRESS[0:Y], an input for receiving data signals DATA, an input for receiving data signals labeled "DATA IN" from ECC error correction circuit 24, an input for receiving error signals labeled "ERROR INFORMATION" from ECC error correction circuit 24, an output connected to latch 28 for providing address signals "ADDR", and an output connected to latch 29 for providing write data "WDATA". Cache 14 is bi-directionally coupled to cache control circuit 13. ECC error correction circuit 24 also includes an input connected to latch 26 for receiving read data signals labeled "RDATA", and an input connected to latch 27 for receiving read checkbits labeled "RCHKBIT". Transaction address queue 22 has an input coupled to receive address ADDR, and an output coupled to an input of ECC error correction circuit 24. ECC checkbit generation circuit 20 has an input for receiving address ADDR, an input for receiving write data WDATA, and an output connected to latch 29 for providing write checkbits labeled "WCHKBIT". System interconnect 20 is provided for coupling one or more slave devices to processor 11. In FIG. 1, representative slave devices include slave device 16 and memory 17. System interconnect 15 can include any type of interconnect circuitry such as for example, a cross-bar switch or combinational logic. System interconnect circuit 15 has an output connected to latch 26 for providing read data RDATA, an output connected to latch 27 for providing read checkbits RCHKBIT, an input connected to latch 28 for receiving address ADDR, an input connected to latch 29 for receiving write data WDATA, an input connected to latch 29 for receiving write checkbits WCHBIT. In memory 17, bus interface unit (BIU) 36 is provided for interfacing memory 17 with circuitry external to memory 17. BIU 36 is bi-directionally connected to system interconnect 15 and to control circuit 34. Memory array 38 includes a plurality of memory cells for storing data. The memory cells can be of any type, including volatile and/or non-volatile memory cells. The memory cells are organized as entries, such as entry 40, where each entry includes a plurality of bits. Entry 40 includes a checkbit portion 42 and a data portion 44. Entry 40 may include other portions not illustrated in FIG. 1. In one embodiment, data portion 44 stores a 64-bit "doubleword" composed of an even and an odd 32-bit word. Checkbit portion 42 may store a single checkbit value for the 64 bits of data, or may store separate checkbit portions for each 32-bit word, depending on the particular embodiment. Control circuit 34 is bi-directionally connected to both BIU 36 and memory array 38. Control circuit 34 controls read and write access operations to memory array 38.

Figure 5:
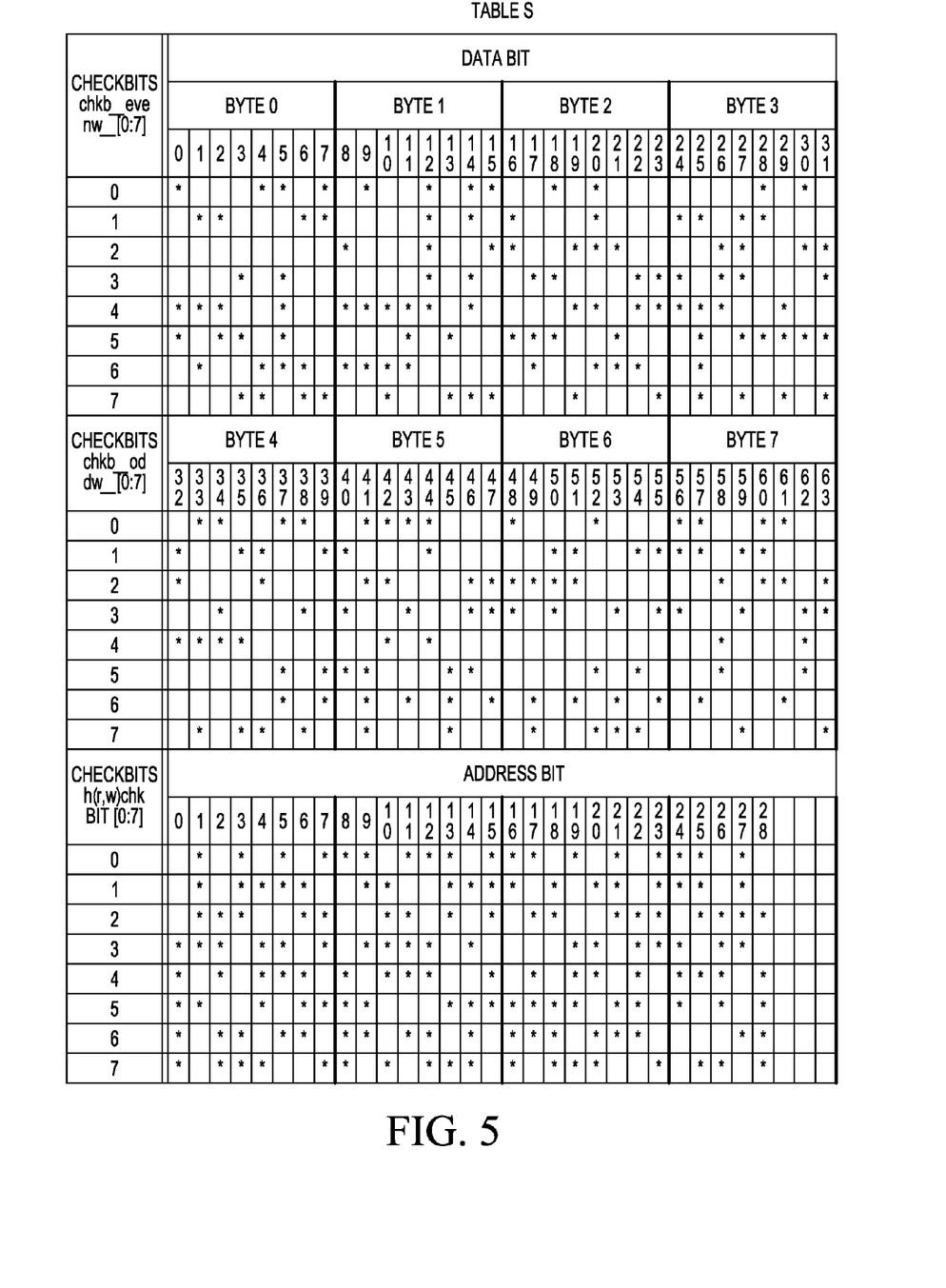
FIG. 5 illustrates a 64-bit data checkbit generation table in accordance with an embodiment.
Figure 6:
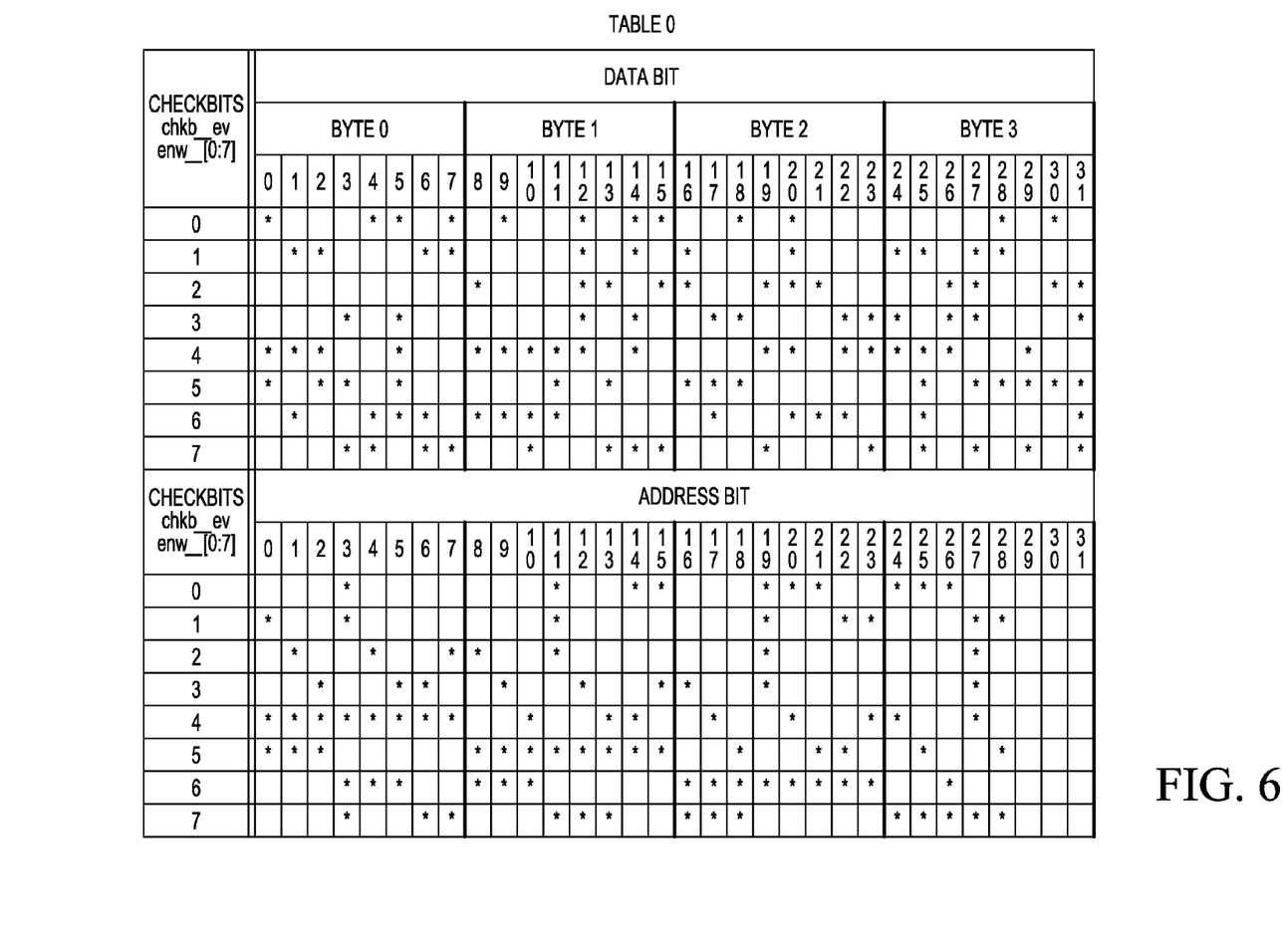
FIG. 6 illustrates a 32-bit data checkbit generation table in accordance with an embodiment.
Figure 7:
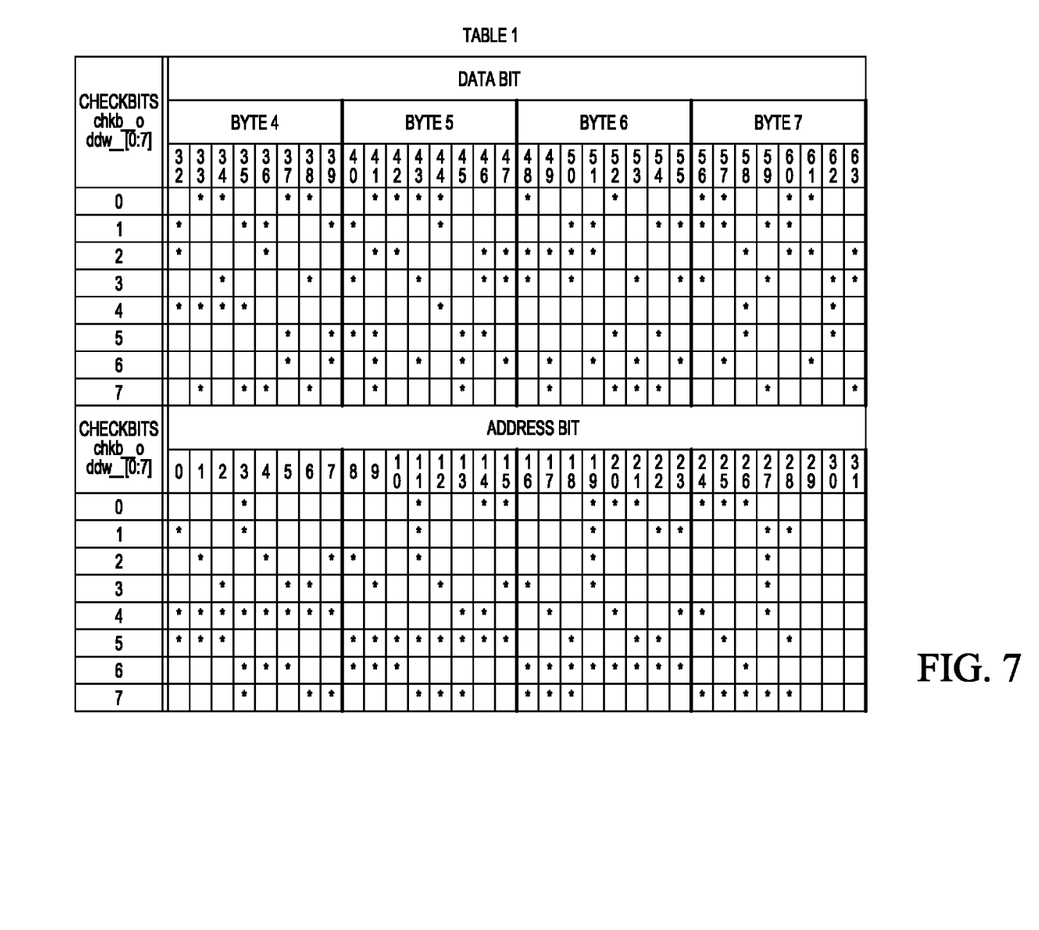
FIG. 7 illustrates a 32-bit data checkbit generation table in accordance with another embodiment.

In data processing systems having cache memory, an ECC granularity of 64-bits of data has been adopted because 64 bits is the basic transfer width of an internal interconnect and is also the natural data width for cache line transfers. In addition, a 29-bit address component is included in order to support the end-to-end address checking function. However, the 64-bit plus 29-bit ECC granularity may not be optimal for a data processor because a majority of data accesses are 32 bits wide. A 64-bit data granularity would require a read-modify-write operation in the data cache for every 32-bit data write access, which is a significant performance penalty. However, a 64-bit data granularity is acceptable for an instruction cache where the only write operations are line-fills consisting of 64-bit doublewords. A checkbit generation table for 64-bit granularity is illustrated in FIG. 5. For 32-bit data accesses a subset of the 64-bit ECC table is used as illustrated in FIG. 6 and FIG. 7. Errors that occur within system interconnect 15 will cause errors, such as an incorrect address, incorrect write data, or incorrect read data to be provided to a slave device or back to the master (processor 11). Errors occurring within memory 17 will manifest themselves eventually in the read data RDATA or read checkbits RCHKBIT returned to processor 11. Errors in an address, such as an address to cache 14 or memory 17, are checked using the circuitry illustrated below in FIG. 2 and an ECC address table illustrated in FIG. 8.

For a write cycle of data processing system 10, internal write address ADDR and internal write data WDATA are sent to checkbit generation logic 20 to generate a set of 8 checkbits using the encoding shown in TABLE S of FIG. 5 for 64-bit ECC granularity. For partial width write operations that are less than the entire 64-bit granularity of the ECC code, such as for a 16-bit or 32-bit data write, the checkbits are calculated based on what values will be driven on the write data WDATA outputs, regardless of whether the particular byte lanes of the WDATA outputs contain active data. The bus transfer takes place with the write data WDATA and the write checkbits WCHKBIT flowing to the addressed slave (slave 16 or memory 17) through system interconnect 15. The checkbits WCHKBIT are used by the slave device to recover the data and address information from the bus, performing any error checking and correction actions, then regenerating a new set of checkbits to be stored in the addressed location by merging the partial width write data with existing data in a read-modify-write operation which generates a new set of checkbits to be stored. If the write operation is a full-width write operation with full-width ECC granularity, that is a 64-bit write operation, then the error checking and corrections may become optional, because any errors will be checked at a later time when the data is re-accessed, thus no regeneration of checkbit information by the slave is required, and in fact may not be desired due to timing delays and other performance factors. The addressed slave device 16 or memory 17 stores the received or regenerated checkbits and the write data (WDATA) into the addressed storage location.

For a read cycle of data processing system 10, the internal read address ADDR is sent to the address portion of the external interface to interconnect 15 via ADDR output latch 28, and also to transaction address queue 22 for eventual use by ECC error correction circuit 24. ECC error correction circuit 24 generates a partial syndrome vector from the current outstanding access address based on the address portion of TABLE S in FIG. 5. This portion can be calculated prior to the read data being returned to the bus. The bus transfer is initiated with the address flowing to the addressed slave device 16 or memory 17 through system interconnect 15. Slave 16 or memory 17 returns the data located at the address received by slave 16 or memory 17 without needing to perform any error checking or correction. If the read operation is a partial width read operation of less than the 64-bit width of the system interconnect bus RDATA, the slave device still drives full 64-bit ECC granularity read data and the corresponding set of checkbits. The checkbits are representative of the address received by the slave device and the returned data. ECC error correction circuit 24 completes the syndrome bit generation based on the read data RDATA and read checkbits RCHKBIT information, and detects/corrects any errors in the received information. If any error has been introduced in the data due to an error in signaling via the system interconnect 15 either on a previous write that updated data in the slave device, or the read transaction being driven to the slave due to an addressing error in the memory at the slave, or due to an error in one or more storage cells of the slave, it is detected and corrected if possible. Corrected data is then provided to cache control 13 for storage in cache 14 and use by processor circuitry 12. If the syndrome generated by ECC error correction circuit 24 indicates an address bit in error, no correction is performed and an exception is generated because the data does not correspond to the requested address, thus the error is not correctable. For cacheable accesses, the corrected data is used to generate a new set of checkbits, and the corrected data and new checkbits are then stored into the cache 14.

The illustrated embodiment uses either full granularity (64-bit) error correction codes or a reduced, or partial, granularity of 32-bit codes. Protection of a 64-bit data element and 29 address bits use 8 checkbits. Protection of 32 data bits and 29 address bits also uses 8 checkbits, with a subset encoding scheme. The specific coding used is illustrated in the tables of FIG. 5, FIG. 6, FIG. 7, and FIG. 8. The tables of FIG. 6 and FIG. 7 use 32-bit granularity and are selected to be subsets of the 64-bit table of FIG. 5. The tables were created using the Hsiao SECDED (single error correction, double error detection) algorithm. In other embodiments, the tables may be created using another ECC algorithm, such as for example, Hamming codes, Reed-Solomon, or BCH. The various error coding functions illustrated in FIG. 2, FIG. 3, and FIG. 4 and described below can be used together or separately in different embodiments.

Figures 2, 3:
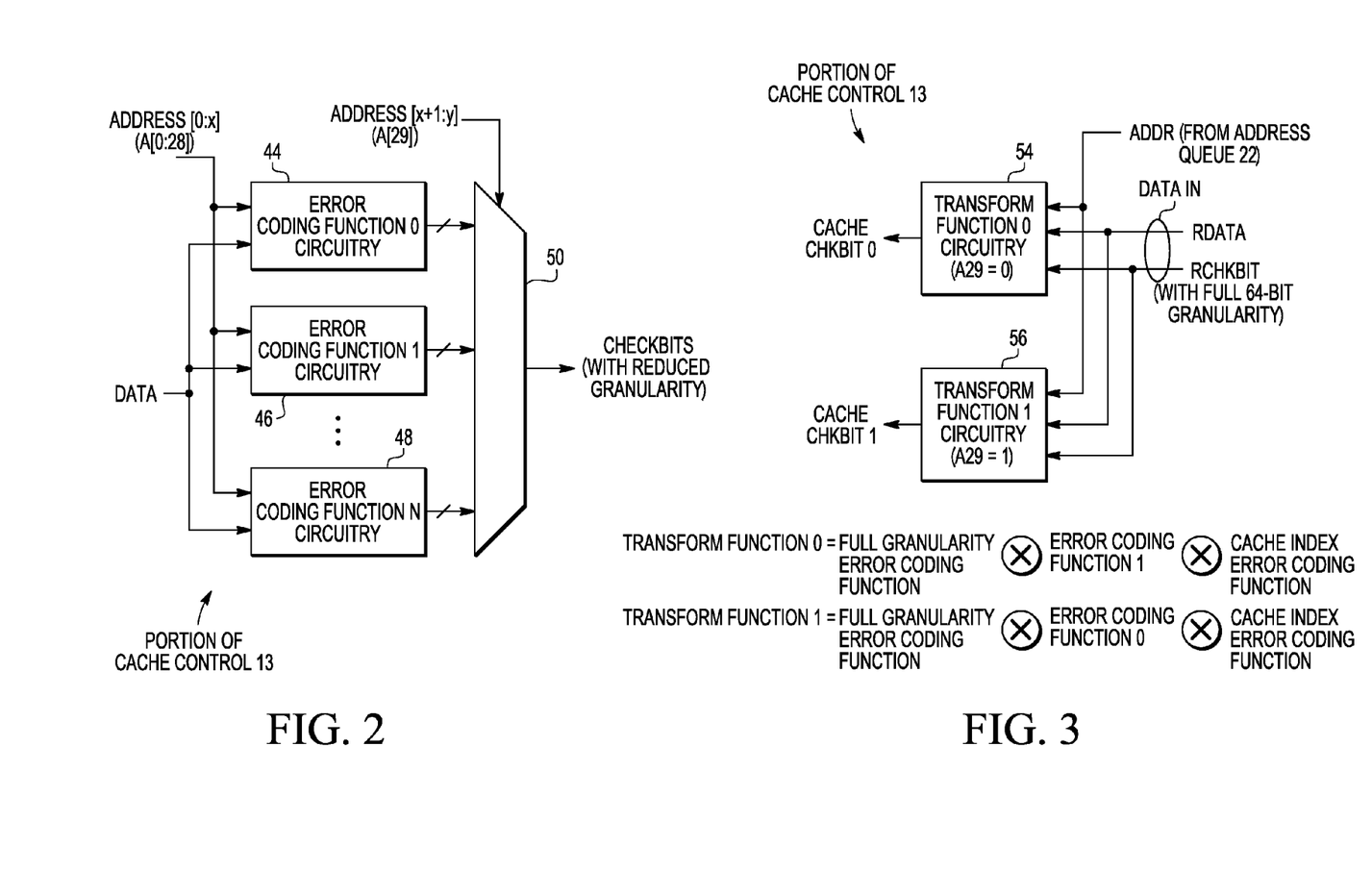
FIG. 2 illustrates a portion of a cache control circuit of the data processing system of FIG. 1 in accordance with one embodiment.
FIG. 3 illustrates a portion of a cache control circuit of the data processing system of FIG. 1 in accordance with another embodiment.

FIG. 2 illustrates a portion of a cache control circuit 13 of the data processing system of FIG. 1 in accordance with one embodiment. The portion of cache control circuit 13 implements a plurality of error coding functions for address and data error detection. For example, the portion of cache control circuit 13 includes error coding function circuitry 44, 46, and 48, and multiplexer 50. Error coding function circuit 44 implements an error coding function 0, error coding function circuit 46 implements an error coding function 1, and error coding function circuitry 48 implements error coding function N, where N is an integer. In one embodiment, only two of the error coding functions of FIG. 2 are used; error coding function circuit 44 implements the ECC table illustrated in FIG. 6 and error coding function circuit 46 implements the ECC table illustrated in FIG. 7. Each error coding function circuit 44, 46, and 48 has two inputs. One input is for receiving address portion ADDRESS [0:X], and the other input is for receiving data DATA from processor circuit 12. In the illustrated embodiment, X is 28. In another embodiment, X can be any integer. Address portion ADDRESS [X+1:Y] is provided to a control input of multiplexer 50, where Y is any integer greater than X. In the illustrated embodiment, Y is bit number 29. An input of multiplexer 50 is connected to an output of each of error coding function circuitry 44, 46, and 48. In response to the address and data inputs, multiplexer 50 selects one of the error coding functions dependent on address bit 29 and provides a checkbit value having 32-bit ECC granularity.

In one embodiment, the address A[0:29] indicates a first storage location for storing a first data value. A first portion of the address is used to select one of the plurality of error coding function circuits. The first portion of the address in the illustrated embodiment is address bit A[29]. When the first portion of the address has a first value, a first one of the plurality of error coding function circuits is selected. The table of FIG. 6 is selected when A[29] is equal to a logic zero. When the first portion of the address has a second value different from the first value, a second one of the plurality of error coding function circuits is selected. The table of FIG. 7 is selected as the coding function when A[29] is a logic one. In one embodiment, the selected error coding function uses the first data value and a second portion of the address A[0:28] to generate a first checkbit value.

FIG. 3 illustrates a portion of cache control circuit 13 of the data processing system of FIG. 1 in accordance with another embodiment. The portion of cache control circuit 13 implements a plurality of error coding functions, including error coding transform functions 54 and 56, to transform 64-bit granularity checkbit values to 32-bit granularity checkbit values. Each of error coding functions 54 and 56 has an input for receiving read data RDATA, and an input for receiving read checkbits RCHKBIT. Transform function 54 has an output for providing checkbit value CACHE CHKBIT 0 and transform function 56 has an output for providing checkbit value CACHE CHKBIT 1.

Figure 4:
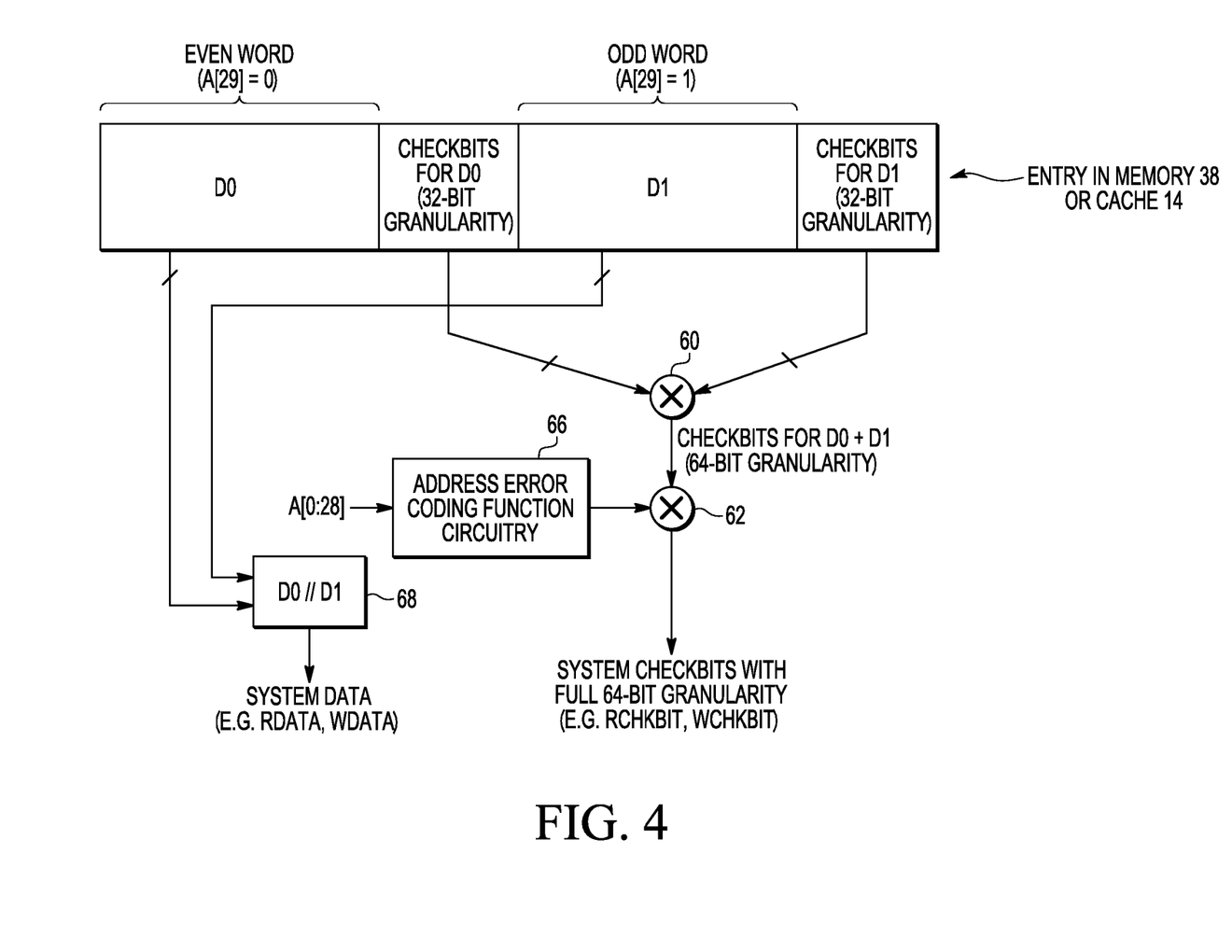
FIG. 4 illustrates a portion of a memory of the data processing system in accordance with an embodiment.

A read operation is initiated in a memory location of memory 17. The read operation may be initiated in response to a cache-miss or a cache linefill operation. In response to the read operation, a first data value RDATA and a first checkbit value RCHKBIT corresponding to the RDATA value are received. The first data value RDATA comprises a first data value portion and a second data value portion. The first data value portion is an even word portion of the memory location corresponding to address bit A[29] being a logic zero, and the second data value portion is an odd word portion of the memory location corresponding to address bit A[29] being a logic one. The first data value RDATA may comprises a 64-bit doubleword and the first and second data value portion are 32-bit words. The first checkbit value RCHKBIT is provided to the first transforming circuit 54 and to the second transforming circuit 56. The first transforming circuit 54 generates a second checkbit value CACHE CHKBIT 0 corresponding to the first data value portion of RDATA. The second transforming circuit 56 generates a third checkbit value CACHE CHKBIT 1 corresponding to the second data value portion (odd word of RDATA). The first data value portion (even word of RDATA) is stored with the second checkbit value CACHE CHKBIT 0 in a first storage location of cache memory 14 and the second data value portion (odd word of RDATA) is stored with the third checkbit value CACHE CHKBIT 1 in a second storage location of cache memory 14. The even and odd word portions are illustrated in FIG. 4. When the first data value portion and the second checkbit value are accessed, the first data value portion is checked using the second checkbit value because the second checkbit value only covers 32 bits of data. If the first data value portion in the cache is subsequently accessed for a read operation, the read operation may be in response to, for example, a load instruction executed by processor circuitry 12 of FIG. 1.

The first transforming circuitry 54 uses a system error coding function circuitry (TABLE S from FIG. 5) for full granularity (64-bit) error coding for generating a checkbit value for an N-bit data value. A first internal error coding function circuitry (TABLE 1 from FIG. 7) is for generating a checkbit value for an M-bit data value, where N is greater than M, and a cache index error coding function (TABLE B from FIG. 9) is used for generating a checkbit value for a cache index of the cache 14. Transforming circuitry 54 generates the checkbit values CACHE CHKBIT 0 by applying the coding functions of TABLE 1, TABLE S, and TABLE B to the ADDR and RDATA inputs and combines the resultant checkbit output values from each of these tables to form a final checkbit value. The second transforming circuitry 56 uses the system error coding function circuitry (TABLE S), second internal error coding function circuitry (TABLE 0) for generating a checkbit value for another M-bit data value, and the cache index error coding function circuitry (TABLE B). The second internal error coding function circuitry using TABLE 0 implements a different coding function than the first internal error coding function using TABLE 1 or the system error coding function circuitry using TABLE S. Transforming circuitry 56 generates the checkbit values CACHE CHKBIT 1 by applying the coding functions of TABLE 0, TABLE S, and TABLE B to the ADDR and RDATA inputs and combines the resultant checkbit output values from each of these tables to form a final checkbit value.

FIG. 4 illustrates a portion of memory 38 or cache memory 14 of the data processing system in accordance with an embodiment. A 64-bit entry in memory 38 includes an even word portion D0 and an odd word portion D1. Each of portions D0 and D1 includes 32 bits of data. In another embodiment, the length of the entry may be different, and there may be a different number of portions. The entry also includes checkbits for D0 and checkbits for D1. The checkbits are for 32-bit granularity. The checkbits for D0 are formed using TABLE 0 (FIG. 6) and the checkbits for D1 are formed using TABLE 1 (FIG. 7). An XOR gate 60 has inputs connected to the checkbits for D0 and the checkbits for D1. An output of XOR gate 60 provides checkbits for data words D0 plus D1 for 64-bit granularity. An XOR gate 62 has an input connected to the output of XOR gate 60 and an input connected to an address error coding function circuitry 66. The address error coding function circuitry 66 has an input for receiving address A[0:28]. The address error coding function circuit 66 uses TABLE A from FIG. 8. A block 68 is provided for concatenating D0 with D1. Block 68 has an output for providing either read data RDATA or write data WDATA which are 64-bit quantities.

In operation, cache 14 of processor 11 or memory storage 38 is accessed. The access may be to a first storage location having even word D0 and an adjacent second storage location having odd word D1. Each location has a checkbit value associated with it. The checkbit value of D0 and the checkbit value of D1 are transformed into a new checkbit value at the output of XOR gate 60 which has full 64-bit granularity to cover the even data word D0 combined with the odd data word D1, but has no address component. The final system checkbits corresponding to the coding function in TABLE S is formed at the output of XOR gate 62 by means of another transformation using the checkbit outputs of address error coding function circuitry 66 which uses TABLE A to provide the checkbits corresponding to the address component A[0:28] of the combined D0 and D1 data. The even data word D0 is concatenated with the odd data word D1 and the new system checkbit values to be provided to system interconnect 15 from either processor 11 on WDATA and WCHKBIT for the case where the cache is supplying data, for example, for a cache copyback operation, or from memory 17 on RDATA and RCHKBIT for the case of a memory 17 read operation by processor 11.

FIG. 5 illustrates a 64-bit (full granularity) system checkbit generation table (TABLE S) in accordance with an embodiment. TABLE S is implemented using a plurality of exclusive OR gates, where each XOR gate outputs one corresponding bit value of a checkbit value. An asterisk (*) in a table entry indicates that the corresponding address and/or data bits are used in an exclusive-OR (XOR) logic operation to form the final checkbit value on the left side of the table. The exclusive OR operation is a bit-by-bit, or bit-wise exclusive OR operation of the table entries. For 64-bit granularity, the table section corresponding to D[0:31], D[32:63], and A[0:29] are combined using an exclusive OR operation to provide a final value driven on the RCHKBIT[0:7] or WCHKBIT [0:7] outputs of the table. Note that the last three bits of the address are not used because the address of a 64-bit doubleword only has 29 bits in the illustrated embodiment.

FIG. 6 illustrates a 32-bit data checkbit generation table TABLE 0 for address bit A[29]=0 corresponding to an even word address. TABLE 0 is implemented using a plurality of exclusive OR gates, where each XOR gate outputs one corresponding bit value of a checkbit value. The exclusive OR operation is a bit-by-bit, or bit-wise exclusive OR operation of the table entries. TABLE 0 of FIG. 6 and TABLE 1 of FIG. 7 show the checkbit codings used when 32-bit data granularity is needed, such as for storage in cache memory 14 or memory 17. The top half of TABLE 0 is for data encoding and the bottom half is for address encoding. For 32-bit granularity, TABLE 0 or TABLE 1 (depending on the word address being either even (A29=0) or odd (A29=1)) are used in transforming between system checkbit encodings using a 64-bit granularity (TABLE S), and cache or memory 17 encodings using 32-bit granularity. The output of each table section is XOR'ed, then XOR'ed with the output of TABLE S, and then the intermediate result is again XOR'ed with the output of TABLE B in FIG. 9 to provide the value used for internal checkbit values for the cache or memory 17 (see FIG. 3). Note that in the illustrated embodiments, there are 29 address bits A[0:28]. The data portion of TABLE 0 defines the checkbit coding function used for data when address bit A29=0.

FIG. 7 illustrates a 32-bit data checkbit generation table TABLE 1 for A[29]=1 corresponding to an odd word address. TABLE 1 is implemented using a plurality of exclusive OR gates, where each XOR gate outputs one corresponding bit value of a checkbit value. The top half of TABLE 1 is for data encoding and the bottom half is for address encoding. TABLE 1 is used when address bit A29=1. The exclusive OR operation is a bit-by-bit, or bit-wise exclusive OR operation of the table entries. As described for TABLE 0, transform circuitry 56 of FIG. 3 also utilizes the outputs of TABLE S, TABLE 1, and TABLE B to provide values used for internal checkbit values for the cache or memory 17. The data portion of TABLE 1 defines the checkbit coding function used for data when address bit A29=1.

Figure 8:
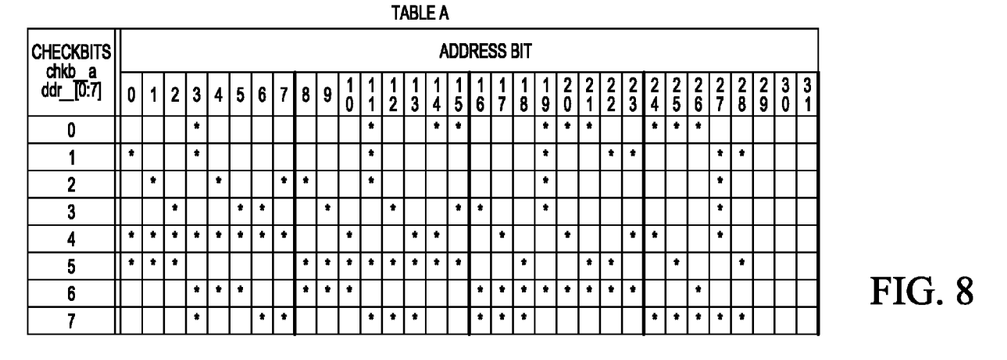
FIG. 8 illustrates an address portion of a checkbit generation table in accordance with an embodiment.

FIG. 8 illustrates an address portion (TABLE A) of a checkbit generation table in accordance with an embodiment. TABLE A is implemented using a plurality of exclusive OR gates, where each XOR gate outputs one corresponding bit value of a checkbit value. TABLE A is the address portion of checkbit generation of 64 or 32-bit ECC granularity. TABLE A is used in conjunction with the portion of cache control 13 illustrated in FIG. 2 and in the process of FIG. 4. TABLE 0 and TABLE 1 (FIG. 6 and FIG. 7) show the checkbit coding used when 32-bit data granularity is selected. The exclusive OR operation is a bit-by-bit, or bit-wise exclusive OR operation of the table entries.

Figure 9:
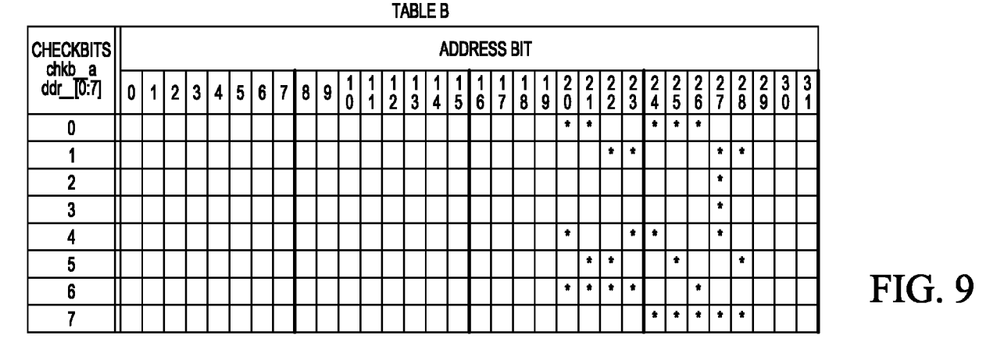
FIG. 9 illustrates a cache index address portion of a checkbit generation table in accordance with an embodiment.

FIG. 9 illustrates a cache index address portion (TABLE B) of a checkbit generation table in accordance with an embodiment. TABLE B is implemented using a plurality of exclusive OR gates, where each XOR gate outputs one corresponding bit value of a checkbit value. TABLE B is the address portion of checkbit generation of 32-bit ECC granularity used in the cache, where only a cache index portion of the access address is used. TABLE B is used in conjunction with the portion of cache control 13 illustrated in FIG. 2 and in the cache checkbit generation logic shown in FIG. 3. The exclusive OR operation is a bit-by-bit, or bit-wise exclusive OR operation of the table entries. TABLE B is similar to TABLE A, but only includes those specific address bits that are used to index into the cache storage array that are not part of the cache TAG value. In the illustrated embodiment, address bits A[20:28] are used to index the cache to select one of 512 sets of cache ways. This address portion of the access address is sufficient to cover addressing errors which may occur internal to the cache array storage.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a plurality of error coding function circuitries, each implementing a different coding function, a method for generating a checkbit value, the method comprising:
    receiving an address which indicates a first storage location for storing a first data value;
    using a first portion of the address to select one of the plurality of error coding function circuitries as a selected error coding function circuitry, wherein:
        when the first portion of the address has a first value, selecting a first one of the plurality of error coding function circuitries as the selected error coding function circuitry, and
        when the first portion of the address has a second value, different from the first value, selecting a second one of the plurality of error coding function circuitries as the selected error coding function circuitry; and
    using the selected error coding function circuitry to generate a first checkbit value, wherein the selected error coding function circuitry uses the first data value to generate the first checkbit value.

2. The method of claim 1, wherein the selected error coding function circuitry uses the first data value and a second portion of the address to generate the first checkbit value.

3. The method of claim 2, wherein the first portion of the address is further characterized as a more significant portion of the address than the second portion of the address.

4. The method of claim 2, wherein the second portion of the address does not include the first portion of the address.

5. The method of claim 1, further comprising:
storing the first data value and the first checkbit value.

6. The method of claim 5, further comprising:
receiving a second address which indicates a second storage location for storing a second data value;
using a first portion of the second address to select another one of the plurality of error coding function circuitries as a second selected error coding function circuitry;
using the second selected error coding function circuitry to generate a second checkbit value, wherein the second selected error coding function circuitry uses the second data value to generate the second checkbit value;
storing the second data value and the second checkbit value;
accessing the stored first data value, first checkbit value, second data value, and second checkbit value;
transforming the first checkbit value and the second checkbit value into a third checkbit value which has a granularity to cover both the first and the second data value; and
storing the first data value concatenated with the second data value and the third checkbit value in a third storage location.

7. The method of claim 6, further comprising:
transferring the first data value concatenated with the second data value over a system interconnect and using the third checkbit value to perform end to end error detection of the first data value concatenated with the second data value.

8. The method of claim 6, wherein the step of transforming comprises:
performing a bit-wise exclusive OR of the first checkbit value with the second checkbit value to obtain the third checkbit value.

9. The method of claim 6, wherein the step of transforming comprises:
performing a bit-wise exclusive OR of the first checkbit value with the second checkbit value to obtain a fourth checkbit value based on the first data value concatenated with the second data value;
providing a second portion of the address to address error coding function circuitry to generate a fifth checkbit value based on the second portion of the address; and
performing a bit-wise exclusive OR of the fourth checkbit value with the fifth checkbit value to obtain the third checkbit value.

10. In a data processing system having a processor and a memory coupled to the processor via a system interconnect, a method comprising:
accessing a cache of the processor to access a first storage location and an adjacent second storage location, wherein the first storage location comprises a first data value and a first checkbit value corresponding to the first data value and the second storage location comprises a second data value and a second checkbit value corresponding to the second data value;
transforming the first checkbit value and the second checkbit value into a third checkbit value which has a granularity to cover the first data value combined with the second data value wherein transforms includes:
performing a bit-wise XOR of the first checkbit value with the second checkbit value to obtain a fourth checkbit value based on the first data value concatenated with the second data value;
providing a second portion of an address to address error coding function circuitry to generate a fifth checkbit value based on the second portion address; and
performing a bit-wise exclusive OR of the fourth checkbit value with the fifth checkbit value to obtain the third checkbit value; and
storing the first data value concatenated with the second data value and the third checkbit value in a storage location of the memory.

11. The method of claim 10, further comprising:
transferring the first data value concatenated with the second data value over the system interconnect from the memory to the processor; and
using the third checkbit value to perform end to end error detection of the first data value concatenated with the second data value.

* * * * *